United States Patent [19]

Abu-Isa

[11] Patent Number: 5,153,065

[45] Date of Patent: * Oct. 6, 1992

[54] DUAL MODULUS ORIENTED ELASTOMERIC FILAMENTS

[75] Inventor: Ismat A. Abu-Isa, Rochester, Mich.

[73] Assignee: General Motors Corporation, Detroit, Mich.

[*] Notice: The portion of the term of this patent subsequent to Apr. 23, 2008 has been disclaimed.

[21] Appl. No.: 629,889

[22] Filed: Dec. 19, 1990

Related U.S. Application Data

[63] Continuation-in-part of Ser. No. 318,998, Mar. 6, 1989, Pat. No. 5,009,955.

[51] Int. Cl.$^5$ .............................................. D02G 3/00
[52] U.S. Cl. ................................. 428/364; 428/401; 525/305; 525/307
[58] Field of Search ............. 525/305, 307; 528/305, 528/307; 428/364, 401

[56] References Cited

U.S. PATENT DOCUMENTS

| | | | |
|---|---|---|---|
| 2,251,318 | 8/1941 | Blair et al. | 155/179 |
| 3,161,436 | 12/1964 | Hood | 299/460 |
| 3,651,014 | 3/1972 | Witsiepe | 528/305 X |
| 3,766,146 | 10/1973 | Witsiepe | 528/305 X |
| 4,096,126 | 6/1978 | Tanaka et al. | 528/305 |
| 4,211,689 | 7/1980 | Borman | 528/307 X |
| 4,545,614 | 10/1985 | Abu-Isa | |

Primary Examiner—Patrick J. Ryan
Assistant Examiner—N. Edwards
Attorney, Agent, or Firm—Randy W. Tung

[57] ABSTRACT

An oriented elastomeric filament spun from a thermoplastic elastomeric material selected from the group consisting of a block copolymer of polybutylene terephthalate and polytetramethylene glycol, a block copolymer of polybutylene terephthalate/polybutylene isophthalate and polyethylene glycol/polypropylene glycol, a block copolymer of polybutylene terephthalate/polyhexene terephthalate and polytetramethylene glycol, and a block copolymer of polyurethane and polytetramethylene glycol, the mole fraction of the polybutylene terephthalate, polybutylene terephthalate/polybutylene isophthalate and polybutylene terephthalate/polyhexene terephthalate in the block copolymers is less than 0.5, the elastomeric filament is further oriented after the spinning by stretching at temperatures between 20° C. to 120° C. to a draw ratio between 500 to 700 percent elongation such that the oriented filament exhibits a two-stage low tensile modulus and high tensile modulus behavior when tested in accordance with ASTM D-638 tensile test.

2 Claims, 2 Drawing Sheets

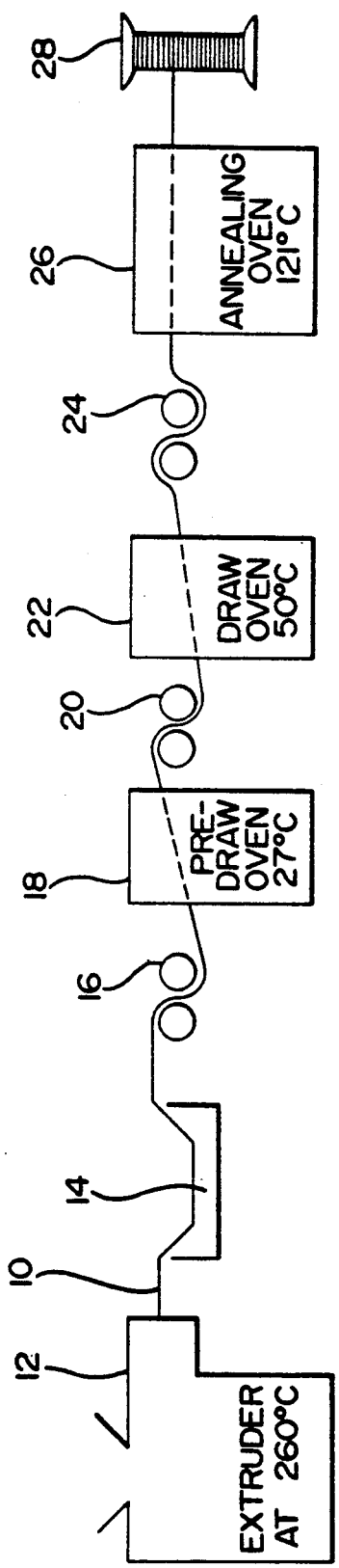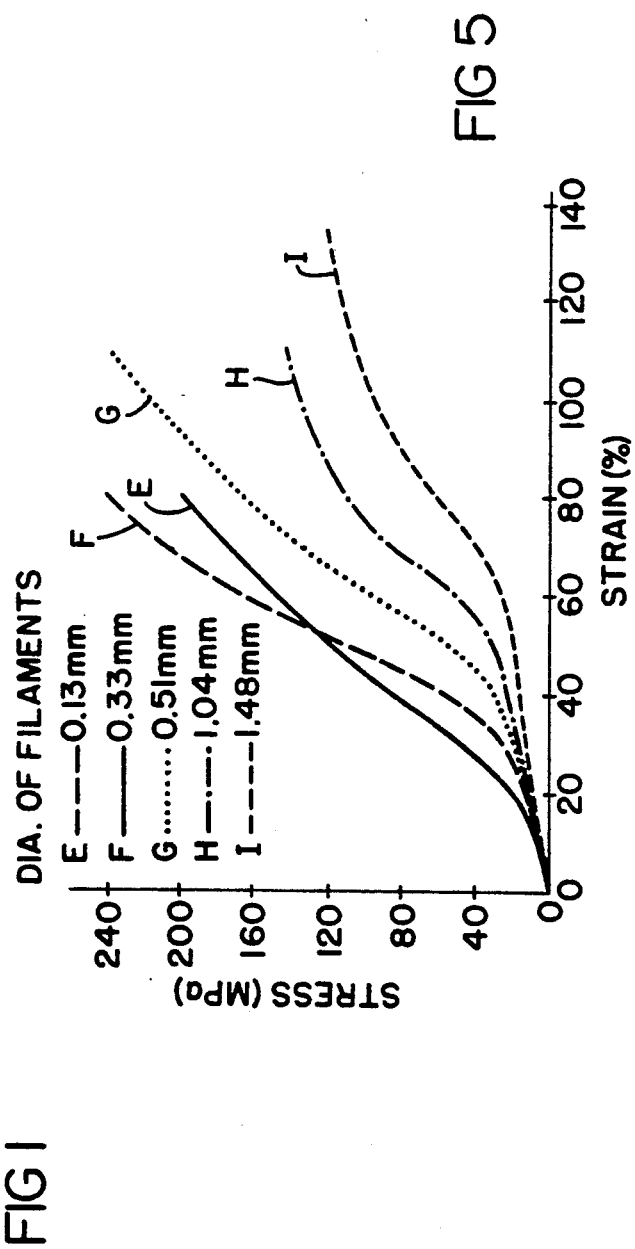

DUAL MODULUS ORIENTED ELASTOMERIC FILAMENTS

This is a continuation-in-part of U.S. application Ser. No. 07/318,998 filed Mar. 6, 1989, and allowed Nov. 28, 1990, now U.S. Pat. No. 5,009,955.

FIELD OF THE INVENTION

This invention generally relates to oriented elastomeric filaments and more particularly to oriented elastomeric filaments which exhibit a dual modulus or a two-stage low tensile modulus and high tensile modulus mechanical behavior when tested in a standard ASTM D-638 tensile test.

BACKGROUND OF THE INVENTION

A feature of the present invention is to provide dual modulus oriented elastomeric filaments to be used in a seat suspension element in a vehicle seat assembly that is a block copolymer material capable of being oriented to provide a two-stage modulus in the direction of the suspension span for providing a high comfort index under static load support conditions and an increasing load support characteristic for absorbing road impacts.

Traditionally, molded foam cushioning elements of the type set forth in U.S. Pat. No. 3,161,436 have been used in automobile and vehicular applications to provide a vehicle seating assembly with both static and dynamic load supporting characteristics for passenger comfort. In such applications, the element is supported by a rigid backing member forming part of the seat assembly frame for attachment to the vehicle body. The modulus of elasticity of the foam cushioning element and the thickness of the element is selected to provide a static deformation which conforms to and comfortably supports the weight and shape of the different passengers.

The cushioning elements have a modulus and are dimensioned to absorb dynamic impacts which are transferred through the vehicle suspension system into the seat assembly In such cases, the modulus and dimensions of the seating element are selected to absorb the impact loading without causing the foam element to fully compress and bottom out against the rigid backing member.

Such objectives can only be combined by use of foam elements having a thickness that will produce impact load absorption in a material of a modulus that has a comfortable feel under static load conditions. Such thickness of the foam element increases the weight of the vehicle seat assembly.

U.S. Pat. Nos. 2,251,318 and 4,545,614 disclose vehicle seat assemblies in which elastomeric webbing or strips are stretched between vehicle seat frame components to form a suspension for a seat cover. In the case of the '318 patent, the strips are covered by a layer of foam material like sponge material which will impart static comfort to the assembly. The strap components are configured to yield to accommodate impact loads. The straps are reinforced by fabric to control against excessive deflection of natural rubber material of the straps.

The '614 patent uses strips or fibers of a material having a modulus at high deformation which is a multiple of natural rubber to control bottoming out of the suspension system. The use of strips, filaments or straps requires a cover to impart a smooth seating surface. Such covers can set to the shape of the underlying strip array following periods of use.

Orientation of various polymeric materials is performed to achieve improved properties such tensile strength, creep resistance, abrasion, and permeability resistance. These various polymers include crystalline thermoplastics, non-crystalline thermoplastics, thermoplastic elastomers, and conventional cross-linkable elastomers. However, none of these commercially available materials in a filament form can be used in a seat suspension application. Some commercial filaments are highly elastic and are excellent for comfort but provide poor support due to their low modulus values. Other filaments have very high modulus values and provide excellent support but are poor on comfort.

It is therefore an object of the present invention to provide a fairly flexible elastomeric filament to provide comfort in a seat suspension and allow an appreciable reduction of the foam material currently used in seat suspensions.

It is another object of the present invention to provide an oriented elastomeric filament for seat suspension applications that has a good balance of physical properties of elastic behavior and high modulus.

It is yet another object of the present invention to provide an oriented elastomeric filament that is tensioned during extrusion to orient the molecular structure of the material and then annealed to fix the material orientation for establishing a two-stage modulus characteristic in the filament.

It is still another object of the present invention to provide an oriented elastomeric filament for absorbing vehicular vibrations and providing increased support in response to increased load.

SUMMARY OF THE INVENTION

The present invention can be carried out by first selecting a suitable material that after orientation possesses a two-stage modulus behavior such that it can be suitably used in a seat suspension application. I have discovered that such a suitable material can be selected from thermoplastic elastomers such as a block copolymer of butylene terephthalate and tetramethylene glycol or a block copolymer of butylene terephthalate and ethylene glycol/propylene glycol.

The filament was first spun by using a small diameter extruder equipped with a suitable metering screw. After the extruder, the filament was predrawn to a ratio of 1.4 at a temperature of 27° C. In the second stage of drawing, the filament is drawn to a ratio greater than 5.0 at a temperature of 50° C. and then annealed in a hot air oven at 120° to 140° C. The filament was allowed to shrink to a ratio of 0.84 during the annealing process. The overall draw ratio of the filament was in the range of 5 to 7.

My novel orientation process produces a tensile strength of the oriented filament at least five times greater than that for the unoriented filament. Most significantly, whereas the oriented filament and the unoriented filament have a similar stress/strain behavior at low strain values, i.e., up to ten percent strain, the stress levels off at higher strain values in the case of the unoriented filament but climbs very fast in the case of the oriented filament. This is what I have called a two-stage modulus behavior. Therefore, the two filaments both feel soft and comfortable when used in a seat suspension application at low elongation, but in the case of an increase in load, the unoriented filament provides no support whereas the oriented filament provides the needed support to prevent the passenger from bottoming out in the seat suspension.

The present invention further resides in various novel constructions and arrangement of processing steps and further objects, novel characteristics and advantages of the present invention will be apparent to those skilled in the art to which it relates and from the following detailed description of the preferred embodiments thereof made with reference to the accompanying drawings forming a part of this specification and, in which:

DESCRIPTION OF THE DRAWINGS

FIG. 1 is a schematic of melt spinning and orientation operation of the elastomeric filament.

FIG. 5 are stress/strain curves of oriented elastomeric filament having a diameter range between 0.13 mm to 1.48 mm.

DETAILED DESCRIPTION OF THE PREFERRED EMBODIMENT

Figure 2:
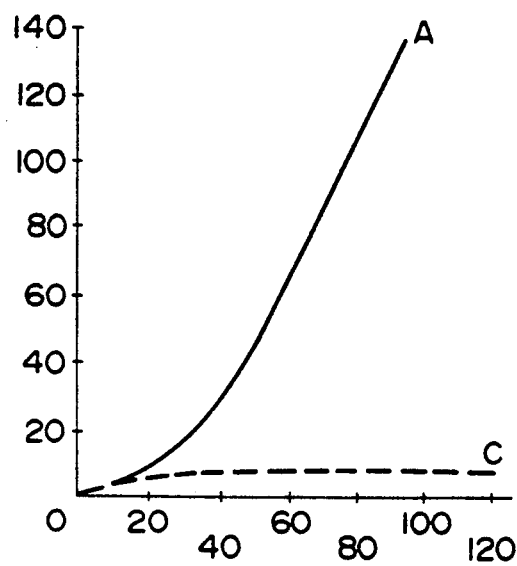
FIG. 2 are stress/strain curves of an unoriented elastomeric filament and an oriented elastomeric filament.

Referring initially to FIG. 1, where a schematic of a melt spinning and orientation operation of the elastomeric filament is shown.

The filament 10 is first spun using a 25.4 mm diameter extruder 12 equipped with a 20 to 1 length/diameter metering screw. For a block copolymer of polybutylene terephthalate and polytetramethylene glycol, the extrusion was conducted at 260° C. The die capillary diameter (not shown) was 2 mm. The spun filament 10 first entered a water cooling bath 14 with cooling water at 20° C. for sufficient cooling before it enters the first set of calendar roll 16. After exiting at the calendar roll 16, the elastomeric filament enters the predraw oven 18 set at 27° C. before being drawn into the second set of calendar roll 20. The predrawing of the filament is accomplished at an L/Lo ratio of 1.14 where L is the final length of the filament after predrawing and Lo is the starting length.

The final drawing of the filament to an L/Lo ratio of greater than 5.0 was carried out at 50° C. through draw oven 22 and the third set of calendar rolls 24. I have tried other drawing temperatures up to 120° C. producing equally satisfactory results. After the final drawing, the oriented elastomeric filament is annealed in a hot air oven 26 at 120° to 140° C. before being picked up by the pickup spool 28. During the annealing, the elastomeric filament was allowed to shrink to an L/Lo ratio of 0.84. The overall draw ratio of the filament was greater than 5.0.

One of the thermoplastic elastomers I have used is a block copolymer consisted of 0.31 mole fraction of crystalline polybutylene terephthalate and 0.69 mole fraction of amorphous polytetramethylene glycol. This thermoplastic elastomer is commercially available as Hytrel ® 4056 from the E. I. DuPont Company. The physical properties of this thermoplastic elastomer are shown in Table I.

TABLE I

| Physical Properties of Hytrel ® 4056 | |
| --- | --- |
| Melting Point (°C.) | 148° C. |
| Hardness, Durometer D | 40 |
| Tensile Strength (MPa) | 23 |
| Ultimate Elongation (%) | 900 |
| Stress at 10% Elongation (MPa) | 2.8 |
| Stress at 30% Elongation (MPa) | 6.9 |
| Stress at 50% Elongation (MPa) | 7.4 |

The tensile properties shown in Table I were determined using a 1.6 mm thick extruded sheet tested using an Instron machine at room temperature and at a crosshead speed of 508 mm/min. The stress/strain curve of this unoriented material is shown in FIG. 2 as curve C. As seen from FIG. 2, the elastomeric material is highly elastic and has a very high value of ultimate elongation and a tensile strength of 23 MPa. The material, as is, is not suitable as a seat suspension material because it does not provide sufficient support. Even assuming that enough of this material may be used to provide good support under static conditions, the seat suspension will highly elongate and bottom out when a sudden load is applied to it such as happens when a car goes over a pot hole in the road.

After the orientation process, the tensile strength of the copolymer of polybutylene terephthalate and polytetramethylene glycol drastically increased to approximately 140 MPa for the oriented filament. This is shown in FIG. 2 as curve A. It is to be noted that in FIGS. 2, 3 and 4, the horizontal axis indicates the percent elongation while the vertical axis indicates the stress in units of mega-Pascal. Most significantly, whereas the two filaments having a similar stress/strain behavior at low strain values (up to 10% strain), the stress levels off at higher strain values in the case of the unoriented sample (curve C) but climbs very fast in the case of the oriented sample (curve A). A two-stage low tensile modulus and high tensile modulus behavior is seen in curve A when the high tensile modulus is at least twice as large as the low tensile modulus. Therefore, the two filaments both feel soft and comfortable in a seat suspension application at low elongation, but in case of increased load the unoriented filament provides no support whereas the oriented filament provides the needed support in preventing the passenger from bottoming out in the seat.

Figure 3:
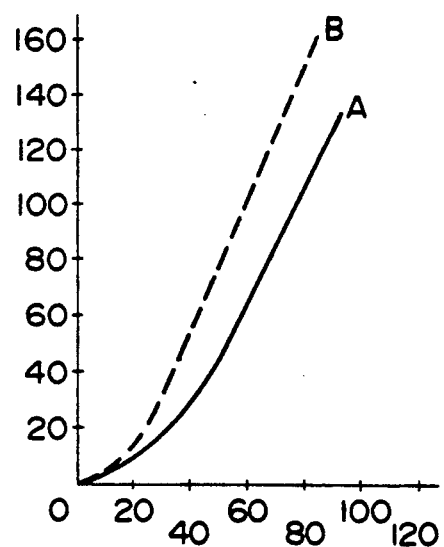
FIG. 3 are stress/strain curves of oriented elastomeric filament, curve A oriented at a draw ratio of 5 and curve B oriented at a draw ratio of 6.

With the block copolymer of polybutylene terephthalate and polytetramethylene glycol, I have discovered that orientation at a draw ratio higher than 5 will result in a stronger filament. At the same time, the desirable characteristics of the stress/strain curve are maintained at the higher draw ratio. This is shown in FIG. 3 as curve B. The draw ratio for curve B was 6. I have also used a draw ratio of 7 on some filaments producing equally satisfactory results.

Figure 4:
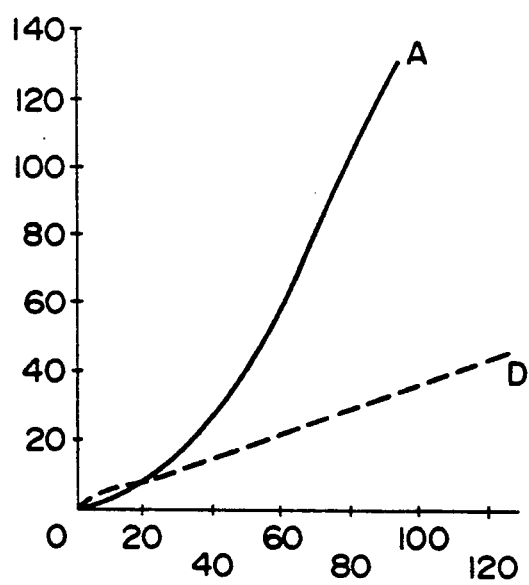
FIG. 4 are stress/strain curves of oriented elastomeric filament, curve A oriented at a draw ratio of 5 and curve D oriented at a draw ratio of 3.5.

More importantly, I have discovered that orienting this block copolymer at a lower draw ratio of 3.5 not only gives a lower strength filament, but also a filament which does not have the desired stress/strain curve. This is shown in FIG. 4 as curve D. It is seen that the oriented filament does not stiffen at higher strains.

I have also studied the effect of the annealing temperature on the orientation of this block copolymer. For instance, raising the annealing temperature after the orientation process from 120° C. to 140° C., the uniformity of the physical properties is greatly improved. This is shown in Table II.

TABLE II

Effect of Annealing Temperature
On Uniformity of Oriented Filament

| Property | Filament Annealed at 120° C. | Filament Annealed at 140° C. |
| --- | --- | --- |
| Mean Load at Break (Newton) | 37.6 | 38.5 |
| Minimum Load at Break (Newton) | 29.4 | 37.9 |
| Maximum Load at Break (Newton) | 43.2 | 39.3 |
| Mean Ultimate Strain (%) | 110 | 96 |
| Minimum Ultimate Strain (%) | 95 | 92 |
| Maximum Ultimate Strain (%) | 140 | 100 |
| Shrinkage After Heating for 15 Minutes at 130° C. in a Hot Air Oven (%) | 63 | 21 |

The average load at break and the mean ultimate strain of the filaments annealed at the two different temperatures are similar. However, the scatter in the experimental values (the difference between the maximum and the minimum values shown in Table II) is very large when the annealing temperature is 120° C. This scattering in the experimental values is greatly reduced for the samples annealed at 140° C. It is to be noted that in each case shown in Table II, ten samples were tested.

I have also discovered that increasing the annealing temperature also improves the dimensional stability of the oriented filaments. This is shown in Table II by the low shrinkage value of the 140° C. annealed sample, i.e., 21%, as compared to the 120° C. annealed samples, i.e., 63%, after exposure to 130° C. temperature in an unrestrained condition for 15 minutes.

TABLE III

Effect of Diameter of Oriented Filament on Tensile Properties Measured Using an Instron at a Crosshead Speed of 127 mm/minute

| Property | Diameter of Filament | | | | |
| --- | --- | --- | --- | --- | --- |
| | 0.13 mm | 0.33 mm | 0.51 mm | 1.04 mm | 1.48 mm |
| Tensile Strength (MPa) | 257 | 313 | 195 | 132 | 106 |
| Ultimate Strain (%) | 89 | 92 | 100 | 104 | 119 |

I have also studied the effect of different diameters of the filament on the physical properties of the block copolymer. This is shown in Table III and FIG. 5.

For some oriented filament samples, I have reduced the diameter of the filament after spinning and orientation from 0.51 mm to 0.13 mm. I discovered that the thinner filament had about the same ultimate strain as the larger diameter filament but it has a higher tensile strength. This is a significant discovery because it could lead to appreciable material savings at comparable strength when the smaller diameter filament is used. I have also produced and oriented larger diameter filaments, i.e., 1.04 mm and 1.48 mm in diameter. As shown in FIG. 5, the same desirable two-stage modulus behavior was observed in all the filaments.

I have also studied elastomeric filaments produced from other thermoplastic elastomeric materials. One of such materials is a block copolymer consisting of 0.25 mole fraction of crystalline polybutylene terephthalate/polybutylene isophthalate and 0.75 mole fraction of amorphous polyethylene glycol/polypropylene glycol. This block copolymer is commercially available as Hytrel ® 4074 from the E. I. DuPont Company. The hardness of this material is similar to that of the block copolymer of polybutylene terephthalate and polytetramethylene glycol.

Other polyesters include block copolymers of polybutylene terephthalate/polyhexene terephthalate crystalline portion and polytetramethylene glycol amorphous portion. The amorphous portion in these polymers is present at concentration greater than 0.5 mole fraction. I have also found that other block copolymers including polyurethane thermoplastic elastomers consisting of a polyurethane crystalline portion and polytetramethylene glycol amorphous portion (more than 0.5 mole fraction) work equally well in my invention.

I have discovered that in order to have a block copolymer that exhibits the two-stage modulus behavior such that it can be suitably used in a seat suspension element, the amorphous portion of the block copolymer must not be smaller than 0.5 mole fraction of the total copolymer. This is an important requirement in the making of elastomeric filaments from thermoplastic elastomeric materials.

Only five preferred embodiments of the invention have been described in detail above, and one skilled in the art will recognize that numerous substitutions, modifications and alterations are permissible without departing from the scope of the invention as demonstrated in the following claims.

The embodiments of the invention in which an exclusive property or privilege is claimed are defined as follows:

1. An oriented elastomeric filament spun from a thermoplastic elastomeric material selected from the group consisting of a block copolymer of polybutylene terephthalate and polytetramethylene glycol, a block copolymer of polybutylene terephthalate/polybutylene isophthalate and polyethylene glycol/polypropylene glycol, a block copolymer of polybutylene terephthalate/polyhexene terephthalate and polytetramethylene glycol, and a block copolymer of polyurethane and polytetramethylene glycol, the mole fraction of said polybutylene terephthalate, polybutylene terephthalate/polybutylene isophthalate and polybutylene terephthalate/polyhexene terephthalate in said block copolymers being less than 0.5, said elastomeric filament being further oriented after said spinning by stretching at temperatures between 20° C. to 120° C. to a draw ratio between 500 to 700 percent elongation such that said oriented filament having a diameter between 0.13 to 1.48 millimeters and exhibits an ultimate strain no larger than 140 percent when tested in accordance with ASTM D-638 tensile test.

2. An oriented elastomeric filament spun from a thermoplastic elastomeric material selected from the group consisting of a block copolymer of polybutylene terephthalate and polytetramethylene glycol, a block copolymer of polybutylene terephthalate/polybutylene isophthalate and polyethylene glycol/polypropylene glycol, a block copolymer of polybutylene terephthalate/polyhexene terephthalate and polytetramethylene glycol, and a block copolymer of polyurethane and polytetramethylene glycol, the mole fraction of said polybutylene terephthalate, polybutylene terephthalate/polybutylene isophthalate and polybutylene terephthalate/polyhexene terephthalate in said block copolymers being less than 0.5, said elastomeric filament being further oriented after said spinning by stretching at temperatures between 20° C. to 120° C. to a draw ratio between 500 to 700 percent elongation such that said oriented filament having a diameter between 0.13 to 1.48 millimeters, exhibits an ultimate strain no larger than 140 percent and a two-stage low tensile modulus and high tensile modulus behavior when tested in accordance with ASTM D-638 tensile test.

* * * * *